United States Patent [19]

Morikawa et al.

[11] Patent Number: 5,078,585
[45] Date of Patent: Jan. 7, 1992

[54] APPARATUS FOR PRODUCING A DOUGH ROLL BY ROLLING UP A DOUGH PIECE

[75] Inventors: Michio Morikawa; Toru Watanabe, both of Utsunomiya, Japan

[73] Assignee: Rheon Automatic Machinery Co., Ltd., Utsunomiya, Japan

[21] Appl. No.: 407,844

[22] Filed: Sep. 15, 1989

[30] Foreign Application Priority Data

Sep. 15, 1988 [JP] Japan .................. 63-120683[U]
Sep. 15, 1988 [JP] Japan .................. 63-231035

[51] Int. Cl.$^5$ .......................... A21C 3/06; B29C 43/02
[52] U.S. Cl. ............................ 425/162; 99/450.1; 425/305.1; 425/321; 425/372; 425/391
[58] Field of Search ............ 425/150, 135, 321, 334, 425/372, 391, 162, 305.1; 99/450.1, 450.2

[56] References Cited

U.S. PATENT DOCUMENTS

| | | | |
|---|---|---|---|
| 2,746,401 | 5/1956 | Archer | 425/321 |
| 3,704,664 | 12/1972 | Fisher, Jr. | 99/450.2 |
| 3,993,422 | 11/1976 | Riviere et al. | 425/321 |
| 4,150,935 | 4/1979 | Venzo | 425/321 |
| 4,171,197 | 10/1979 | Sato | 425/321 |
| 4,389,176 | 6/1983 | Nenci | 425/321 |
| 4,703,679 | 11/1987 | Hayashi et al. | 425/319 |
| 4,741,263 | 5/1988 | Ueno et al. | 99/450.2 |
| 4,905,583 | 3/1990 | Hayashi et al. | 99/450.2 |

FOREIGN PATENT DOCUMENTS

NR. 382762 4/1987 Austria.
0204490 12/1986 European Pat. Off. ............ 425/391

*Primary Examiner*—Willard E. Hoag
*Attorney, Agent, or Firm*—Guy W. Shoup; David W. Heid

[57] ABSTRACT

An apparatus is provided for producing a dough roll by rolling up a dough piece. The apparatus has a moving means that includes a holding roller and an endless belt supply device, and a rolling up mechanism having upper and lower endless belt devices. The belt of the upper endless belt device moves rearwardly, and the belt of the lower endless belt device moves forwardly at a speed higher than that of the upper endless belt device. When a dough piece is fed to the apparatus the leading end begins to be rolled at the upstream ends of the upper and lower endless belt devices while its trailing end stays between the belt of the endless belt supply device and the holding roller. Therefore, the leading end moves at a speed which equals the difference between the speeds of the upper and lower endless belt devices while the trailing end moves at the same moving speed as that of the belt of the endless belt supply device. By controlling the relation of the speeds of these endless belt devices, the dough piece is stretched to have a desired length in the feeding direction. When the dough piece is rolled, a dough roll having a desired number of layers can be produced.

14 Claims, 6 Drawing Sheets

FEEDING DIRECTION

FIG. 7

APPARATUS FOR PRODUCING A DOUGH ROLL BY ROLLING UP A DOUGH PIECE

BACKGROUND OF THE INVENTION

1. The Field of the Invention

This invention relates to an apparatus and method for producing a dough roll piece, and, particularly, to an apparatus and method for producing a dough roll in which the number of layers of a finished roll can be adjusted.

2. Description of Prior Art

Many apparatuses have been developed to automatically roll up dough pieces to automatically produce dough rolls.

U.S. Pat. No. 3,704,664 teaches an apparatus for forming Swiss rolls, in which apparatus a dough sheet is fed forwardly on a lower conveyor, and the rear edge of the dough sheet is lifted upwardly by the upper segment of a lifting means, and the lifted rear edge of the dough sheet is contacted by a forwardly moving upper conveyor, to then be rolled.

U.S. Pat. No. 4,741,263 teaches an apparatus and method for producing croissants. In this apparatus dough pieces are fed between two endless belt devices whose belts move in opposite directions, and then the dough pieces are rolled. Mean are provided to adjust the gap between the two belts so as to decrease the gap so as to kick up the forward end of the dough piece. The forward end of the dough piece contacts the upper conveyor, and begins to be rolled. Then, the adjustment means increases the gap between the two belts to allow for the increase in the direction of the rolled dough pieces and to permit a smooth rolling up of the dough piece. Finally, a finished dough roll is discharged from the gap between the belts. In these devices the number of layers of the roll cannot be adjusted.

In general, the number of layers of a dough roll varies based on the type of bread or confectionary produced. Therefore, if an apparatus is designed for producing a croissant, it cannot be used for producing other types of bread, such as a Swiss roll. According to the prior art different apparatuses must be used to produce different kinds of dough rolls. Further, if the thickness or length of a dough piece changes, the prior art apparatuses cannot adjust to such changes and properly roll up the dough piece.

SUMMARY OF THE INVENTION

One object of this invention is to provide an apparatus and method that can produce dough rolls for various kinds of bread.

Another object of this invention is to provide an apparatus and method in which the number of layers of a dough roll can be readily adjusted, based on the type of finished bread.

A further object of this invention is to provide an apparatus and method that produces dough rolls that are not easily loosened.

In one aspect of this invention an apparatus for producing dough rolls by rolling up a dough piece is provided, comprising a moving means for moving each dough piece in a feeding direction, and a rolling up mechanism for rolling up the dough piece while moving it in the feeding direction. The rolling up mechanism has a lower endless belt device and an upper endless belt device arranged one above the other, wherein the lower endless belt device has an upper belt portion moving in the feeding direction, and the upper endless belt device has a lower belt portion moving in the opposite direction of the feeding direction at a speed lower than the moving speed of the upper belt portion of the lower endless belt device. The belt portions face each other with a spacing therebetween. The apparatus also comprises a first driving means for driving each of the upper and lower endless belt devices, and a second driving means for driving the moving means at a speed lower than the upper belt portion of the lower endless belt device. The first and second driving means are formed so that the speeds of the lower belt portion of the upper endless belt device and the upper belt portion of the lower endless belt device can be adjusted based on the number of layers of a finished dough roll, in relation to the speed of moving means.

In another aspect of this invention a method for producing dough rolls by rolling up a dough piece is provided, comprising feeding dough pieces by a moving means to a space between two vertically opposed upper and lower endless belt devices, and rolling up the the dough pieces while moving them in the feeding direction by moving the respective belts of the upper and lower endless belt devices in opposite directions where they face each other. The belt of the lower endless belt device is moved in the feeding direction and faster than the belt of the upper endless belt device. The method is characterized by the steps of moving the trailing end of the dough at the same speed as the moving speed of the moving means while moving the leading end at a speed that equals the difference between the speed of the upper endless belt device and that of the lower endless belt device are controlled relation of the speeds of the belts of the upper and lower endless belt devices and the moving means so as to stretch the dough pieces so that they have a desired length in the feeding direction and enable the rolling up of the dough roll having a desired number of layers.

In this invention dough pieces are fed into the space between the upper and lower endless belt devices. The leading end of each dough piece is transferred to the lower endless belt device and contacted by the upper endless belt device so that the dough piece begins to be rolled. Since the upper belt portion of the lower endless belt device and the lower belt portion of the upper endless belt device are driven in opposite directions, but the the upper portion of the lower endless belt device moves in the feeding direction at a speed higher than that of the lower portion of the upper endless belt device, the dough pieces moves in the feeding direction at a speed equal to the difference between the moving speed of the upper and lower belt portions. At the time the rolling of the dough piece starts, the trailing end of the dough piece is still on the moving means and moves at a speed equal to the moving speed of the moving means. Therefore, the dough piece is stretched so that it has a desired length by controlling the relation between the moving speed of the belt portions and the moving means, and then rolled, thereby producing dough rolls having a desired number of layers.

PREFERRED EMBODIMENT OF THE INVENTION

A first embodiment of this invention will now be described by reference to the drawings.

Figure 1:
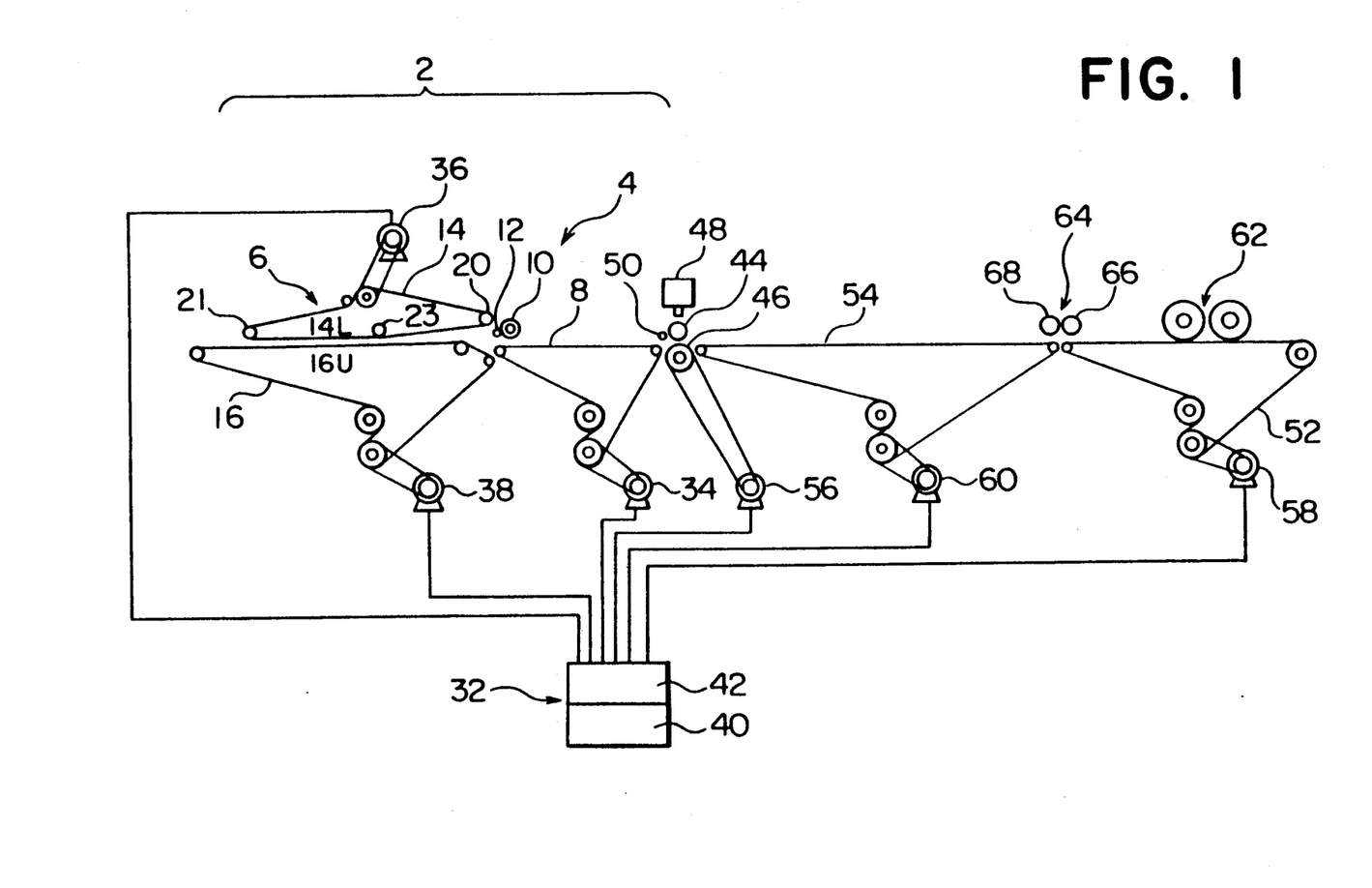
FIG. 1 shows an apparatus for producing dough rolls, according to a first embodiment of this invention, which apparatus is included in a French bread dough production line.

In FIG. 1 an apparatus for producing the dough roll of the first embodiment is shown. The apparatus (2) includes a moving means (4) and a rolling up mechanism (6).

The moving means (4) comprises an endless belt supply device (8) and a holding roller (10) positioned above the upper flight of the endless belt supply device (8) and adjacent its downstream end. The moving means (4) further includes a first roller of a small diameter (12) that is positioned downstream of and adjacent to the peripheral surface of the holding roller (10). The first small roller rotates in the feeding direction (clockwise in FIG. 1) and is driven such the its peripheral speed is faster than that of the holding roller (10) so if a dough piece that adheres to the peripheral surface of the holding roller (10) it can be peeled off of the holding roller and transferred to the rolling up mechanism (6).

Figure 2:
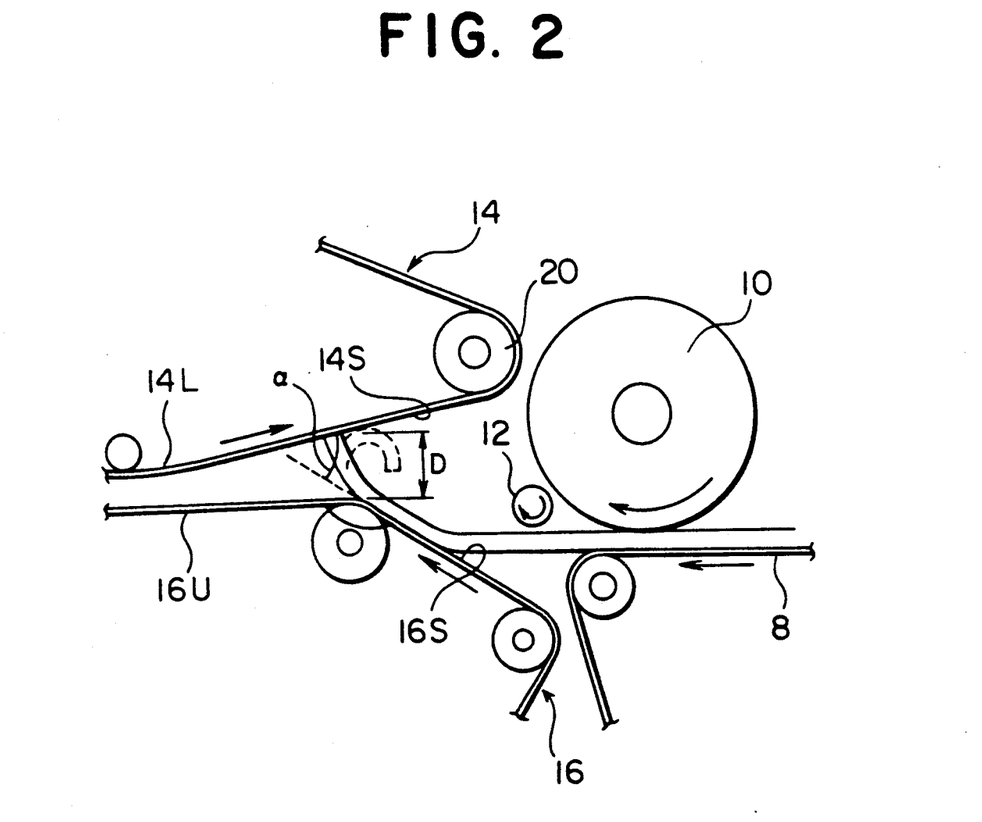
FIG. 2 shows an enlarged view of the upstream end portions of the upper and lower endless belt devices of the apparatus in FIG. 1.

The rolling up mechanism (6) includes upper and lower endless belt devices (14, 16). These endless belt devices are arranged one above the other so that the upper belt portion (16U) of the lower endless belt device and the lower belt portion (14L) of the upper endless belt device face each other with a spacing of about 10-30 mm between them. Although the belt of the belt device (16) is tightly stretched, the belt of belt device (14) is relatively loosely stretched. In this mechanism the upper belt portion (16U) of the lower endless belt device (16) moves in the feeding direction. In contrast, the lower belt portion (14L) of the upper endless belt device moves in the direction opposite to the feeding direction at a speed lower than that of the upper belt portion (16U). In this embodiment, as shown in FIG. 2, the upper belt portion (16U) of the lower endless belt device (16) and the lower belt portion (14L) of the upper endless belt device (14) have their respective sloped portions (14S, 16S) at their upstream ends. The sloped portions are positioned at an angle ($\alpha$) of approximately 35° to define a tapered gap between them, such that the gap progressively decreases from the upstream ends of the upper and lower endless belt devices to the downstream ends of the sloped portions (14S, 16S).

Figure 3:
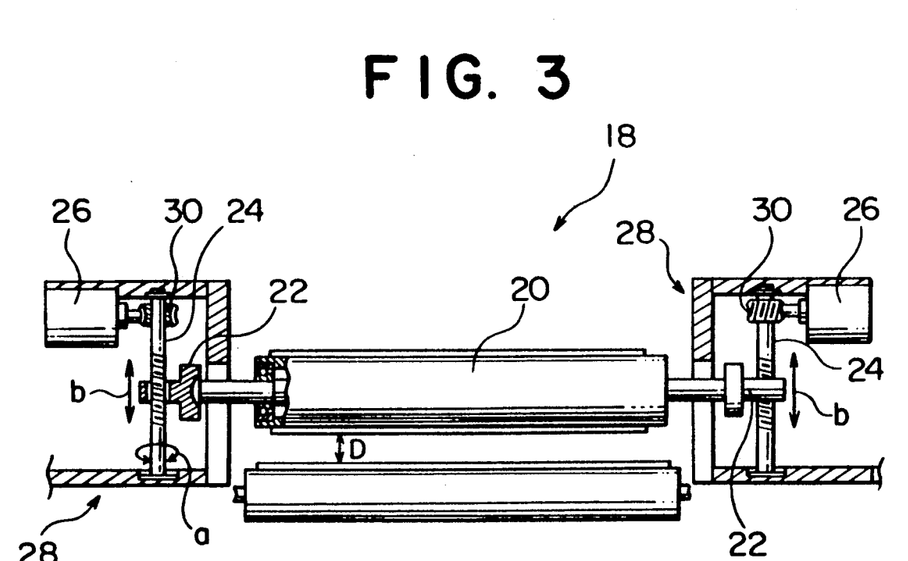
FIG. 3 shows an enlarged view of a device for adjusting the angle defined by sloped portions of the belt of the upper and lower endless belt devices.

Further, the rolling up mechanism (6) includes an adjusting means (18 in FIG. 3) to raise and lower a roller (20) at the upstream end of the upper endless belt device (14) so that the angle ($\alpha$) can be adjusted. FIG. 3 shows in detail the features of an example of the adjusting means (18). The adjusting means includes a pair of ball links (22), a pair of vertical shafts (24), each having a threaded portion, and a pair of reversible motors (26). In this embodiment, all elements in FIG. 1 are mounted on a frame stand. The frame stand includes two side casings (28), each of which are mounted on legs. Both ends of the axes of the respective rollers are rotatably mounted on the side walls of the side casings (28). Also, the motors for the respective rollers are mounted in the side casings and connected to the axes of the rollers. The respective ball links (22), thread shaft (24), and reversible motors (26), are arranged in the side casings (28) of the frame stand. Both ends of an axial shaft of the upstream end roller (20) are connected to the ball links (22). Each thread shaft (24) is rotatably mounted on the side casing (28) via bearings. The drive shaft of each reversible motor (26) is connected to a thread shaft (24) via a worm wheel (30) so that the reversible motors (26) axially rotate the thread shafts (24) as shown by the arrow a in FIG. 3. Therefore, as the shafts axially rotate in one or the other direction, the ball links (22) which hold the upstream end roller (20) of the upper endless belt device are raised and lowered as shown by the arrow b.

In contrast, the levels of the axial shafts of a downstream end roller (21, FIG. 1) of the upper endless belt device (14), and a middle roller (23) positioned at the downstream end of the sloped portion (14S) of the upper endless belt device (14), cannot be changed. However, when the upstream end roller (20) of the upper endless belt device (14) is raised or lowered, the sloped portion (14S) of the upper endless belt device can be pivotally moved about the middle roller (23). Therefore, when the upstream end roller (20) is raised the angle ($\alpha$) becomes larger. When the upstream end roller (20) is lowered, the angle ($\alpha$) becomes smaller.

The apparatus further includes a control unit (32), which comprises a memory means (40) and a signal generator (42). The control unit (32) is a SEQUENCER Model F2-60M2 by Mitsubishi Electric Corporation. As shown in FIG. 1, a first motor (34) drives the belt of the endless belt supply device (8), a second motor (36) drives the belt of the upper endless belt device (14), and a third motor (38) drives the belt of the lower endless belt device (16). The control unit (32) is operatively connected to these motors and the reversible motors of the adjusting means. Based on the data stored in the memory means (40), signals are sent to each motor so that the speeds of the belts of the endless belt devices (8, 14 and 16) can be adjusted, and so that the angle of the gap between the sloped portions (14S, 16S) can be adjusted.

In FIG. 1, the apparatus of this embodiment is included in a production line for French bread dough pieces. Therefore, a cutting device and spacing device are provided upstream of the apparatus of this embodiment. These additional devices will now be explained.

Figure 4:
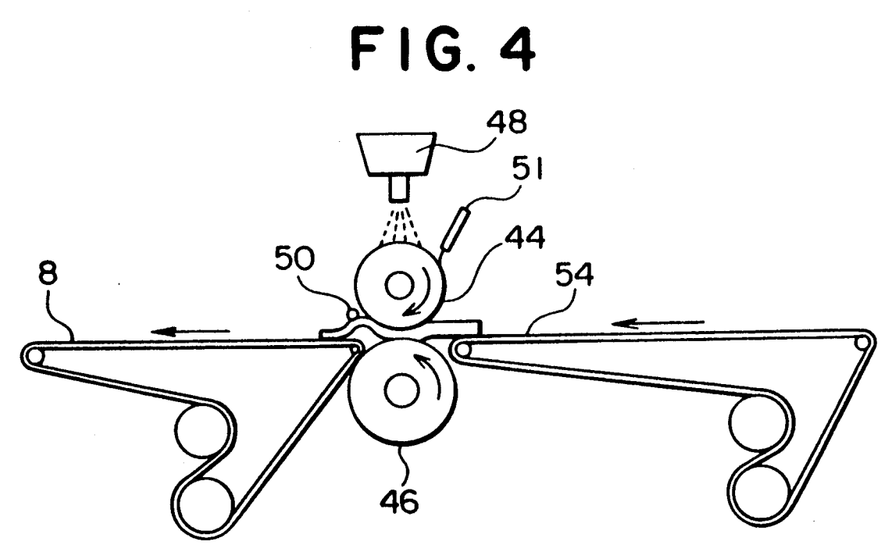
FIG. 4 shows a device for providing water to the peripheral surface of the upper roller of a pair of vertically juxtaposed rollers of the apparatus in FIG. 1.

Adjacent the upstream end of the endless belt supply means (8), a pair of vertically juxtaposed rollers (44, 46) are provided. An enlarged view of the juxtaposed rollers (44, 46) are shown in FIG. 4. The lower roller (46) of the juxtaposed rollers is driven by a fourth motor (56) at the same peripheral speed as the upper roller (44). The endless belt supply device (8) is driven so that its upper flight moves faster than the peripheral speed of the pair of juxtaposed rollers (44, 46). Above and adjacent the upper roller (44), a watering means for sprinkling water (48) is provided, and it wets the peripheral surface of the upper roller (44). A second roller of a small diameter (50) is provided adjacent and downstream of the upper roller (44). The second small roller (50) is rotated in the feeding direction at a peripheral speed faster than the peripheral speed of the upper roller (44). Further, a brush (51) is provided for uniformly spreading the water fallen from the watering device (48), onto the surface of the upper roller (44).

First and second endless belt devices (52, 54) are provided upstream of the pair of vertically juxtaposed rollers (44, 46). The second endless belt device (54) is arranged in series with and downstream of the first endless belt device (52) and its downstream end is positioned adjacent the lower roller (46). The belts of the first and second endless belt devices (52, 54) are driven by a fifth and sixth motor (58, 60).

Above the upper flight of the first endless belt device (52), in pressing engagement with the upper flight, a cylindrical cutter device (62) is provided. The cylindrical cutter device (62) may be a cutter as disclosed in U.S. Pat. No. 4,703,679, which patent is hereby incorporated in this specification by reference. The cylindrical cutter device (62) is provided along its cylindrical surface with blades arranged in a pattern capable of forming the rectangles in the dough web as shown in FIG. 5.

In a bridging area where a dough piece moves from the first endless belt device to the second endless belt device, a spacing means (64) is provided. The spacing means (64) includes a pair of rollers (66) and a roller (68) positioned ahead of said pair of rollers (66), all of which rollers (66, 68) are provided on their peripheral surfaces with protrusions extending in a direction transverse to the feeding direction. The pair of rollers (66) are driven at the same speed as the moving speed of the belt of the first endless belt device (52). The roller (68) is driven at the same speed as the moving speed of the belt of the second endless belt device (54).

Figure 5:
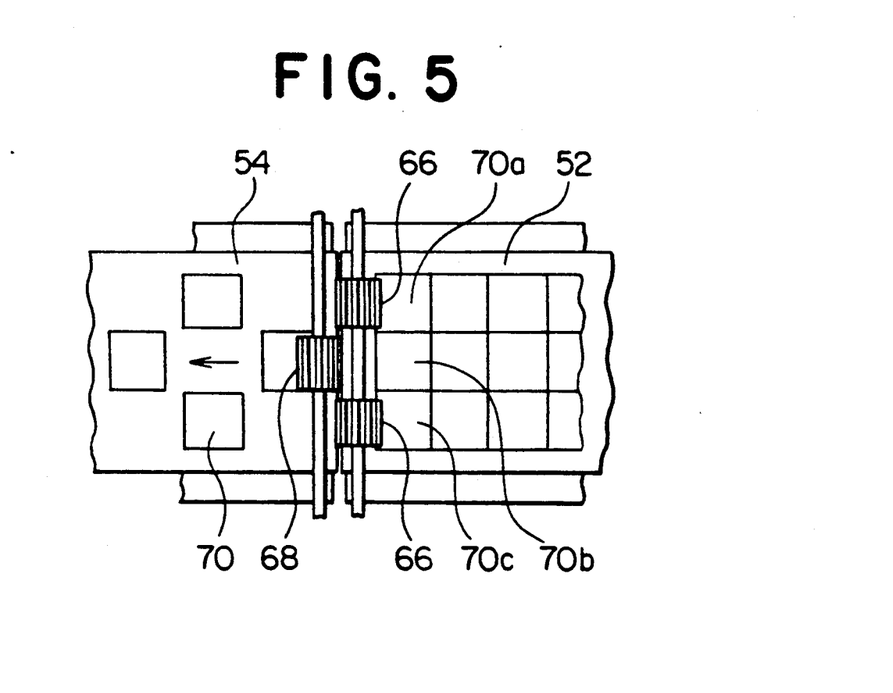
FIG. 5 shows a spacing device of the apparatus shown in FIG. 1.

As shown in FIGS. 1 and 5, the pair of rollers (66) are mounted above the upper flight of the first endless belt device (52) and adjacent its downstream end, and the roller (68) is mounted above the upper flight of the second endless belt device (54) and adjacent its upstream end. The belt of the first endless belt device (52) is driven at a slower speed than that of the second endless belt device (54). When the rectangular dough pieces (70) formed from the dough web arrive under the pair of rollers (66), they hold dough pieces on both sides (in FIG. 5, the uppermost and lowermost dough pieces 70a and 70c) to make sure that the dough pieces (70a 70c) move at the same speed as the moving speed of the belt of the first endless belt device (52). In contrast, when a middle dough piece (70b) is transferred to the second endless belt device, the roller (68) makes sure that the dough piece (70b) moves with the same speed as the moving speed of the belt of the second endless belt device (54). Since the moving speed of the belt of the second endless belt device (54) is faster than that of the first endless belt device (52), when the middle dough piece (70b) comes under the roller (68), it is carried forward ahead of the dough pieces (70a, 70c) on both sides to provide a predetermined space apart from the side end dough pieces (70a, 70c), which are slowly transferred to the second endless belt device (54). Therefore, on the belt of the second endless belt device (54) the rectangular dough pieces are arranged at a predetermined space between the middle dough piece (70b) and the side end dough pieces (70a, 70c), as shown in FIG. 5. By adjusting the difference between the moving speed of the belts of the first and second endless belt device (52, 54), the space between the middle dough piece (70b) and the side end dough pieces (70a, 70b) is readily adjusted. Such adjustment is performed by the control unit (32), which is operatively connected to the fifth and sixth motors (58, 60) for the first and second endless belt devices (52, 54).

The operation of the apparatus in FIG. 1 will now be explained.

An operator places a web of dough on the belt of the first endless belt device (52). The dough web is fed under the cutting device (62) and then it is divided into dough pieces of a rectangular shape, which are then arranged in three lines extending along the feeding direction, as shown in FIG. 5.

The dough pieces (70) are then fed to the spacing device (64). As discussed above, the spacing device (64) arranges the dough pieces (70b) in the middle line, and they are spaced apart from and ahead of the dough pieces (70a, 70c) in both side lines at a predetermined distance, when the dough pieces are transferred from the first endless belt device (52) to the second endless belt device (54).

The dough pieces are then fed into the space between the pair of juxtaposed rollers (44, 46). Since the watering means (48) wets the peripheral surface of the upper roller (44), the upper surfaces of the dough pieces that contact the wet peripheral surface become wet and adhere to the peripheral surface. Therefore, the small roller (50) peels off the dough piece from the upper roller, and the dough piece is transferred onto the endless belt supply device (8).

The dough piece then moves into the space between the holding roller (10) and the belt of the endless belt supply device (8). Since the upper surface of the dough piece is wet and tends to adhere to the peripheral surface of the holding roller (10), the small roller (12) peels off the leading end of the dough piece from the holding roller (10), and makes sure that the dough piece is transferred to the rolling up mechanism (6).

As shown in FIG. 2, when the leading end of the dough piece arrives at the sloped portion (16S) at the upstream end of the lower endless belt device (16), the leading end moves up along the belt of the sloped portion (16S) and then contacts the sloped portion (14S) of the belt of the upper endless belt device (14). That is, the sloped portions (14S, 16S) ensure that the leading end begins to be rolled. Therefore, as shown by the dotted line in FIG. 2, the leading end of the dough piece begins to be rolled. Because the belt of belt device (14) is relatively loosely stretched, when the dough piece is rolled, the loose portions of the belt gather at the belt portion located between the rollers (20, 23) so as to smoothly roll the dough piece. The leading end of the dough piece moves at a speed equal to the difference between the moving speed of the belt of the upper and lower belt devices (14, 16), because the belts of the upper and lower endless belt devices are driven in opposite directions. In contrast, the trailing end moves at the same speed as the moving speed of the belt of the endless belt supply device (8), because the holding roller (10) is driven to rotate in the same direction of movement and at the same speed as that of the belt of the endless belt supply device (8). Therefore, when the speeds of the belts of the upper and lower endless belt devices (14, 16) and the endless belt supply device (8) are respectively represented as $V_1$, $V_2$ and $V_3$, the moving speed of the leading end of the dough piece $V_x$ can be described, somewhat roughly, as:

$$V_x = V_2 - V_1$$

When the endless belt supply device (8) is driven so that the moving speed of its belt $V_3$ is slower than the difference in speed of the belts of the upper and lower endless belt devices (14, 16) $V_x$, $V_3 < V_x$, that is, the trailing end moves slower than the leading end, the dough piece is stretched by the difference in speeds $V_x - V_3$. In this invention the number of layers of rolled dough corresponds to the number of times of winding a dough piece. Therefore, when a dough piece is wound five times, the rolled dough piece has five layers.

For example, to roll up a dough roll having five layers, the speeds $V_1$, $V_2$ and $V_3$ may respectively be set at 15 m/min., 56 m/min., and 35 m/min. Therefore the moving speed of the leading end $V_x$ is 41 m/min. Since the moving speed of the trailing end is 35 m/min., the dough piece is stretched by $V_x - V_3$, that is, 6 m/min. Therefore, the length of dough stretched per minute is 6 m.

Further, when a dough roll having seven layers is rolled, the speeds $V_1$, $V_2$ and $V_3$ are respectively set at 15 m/min., 70 m/min., and 35 m/min. The leading end of the dough piece moves at 55 m/min. and its trailing end moves at 20 m/min. Thus, the dough piece is stretched by the speed difference 20 m/min. Therefore, the length of dough stretched per minute is 20 m.

Therefore, the larger the difference in speed $V_x - V_3$ becomes, the longer the dough piece is stretched in the feeding direction, and the greater the number of layers the finished dough rolls becomes. Therefore, by controlling the relation between the speeds of the belts of the endless belt supply device (8) and the upper and lower endless belt devices (14, 16), the number of layers of the finished dough roll can be adjusted. The table lists the different speeds $V_1$, $V_2$ and $V_3$ used to prepare kinds of dough and the different characteristics of those doughs.

As was discussed above, the control unit (32) controls the first and second motors (34, 36) so that the moving speeds of the belts of these three endless belt devices are set at predetermined speeds. In this embodiment the data for the respective speeds $V_1$, $V_2$ and $V_3$, for the endless belt devices (8, 14, 16), respectively are stored in the memory (40). Therefore, when the operator presses down the button for a dough roll of five or seven layers on the control panel of the control unit (32), the signal generator (42) sends signals to the first, second, and third motors (34, 36, 38) so that the endless belt devices (8, 14, 16) are driven at the respective predetermined speeds.

As discussed above, the upstream end roller (20) of the upper endless belt device of the first embodiment can be raised or lowered by the adjusting means (18) in FIG. 3. Therefore the angle (α) defined by the sloped portions (14S, 16S) of the belts of the upper and lower endless belt devices can be adjusted, and thus the distance D (in FIG. 2) between the belts of the area where the leading end of the dough piece begins to be rolled can be adjusted. When the diameter of the core portion of the dough roll from which the dough piece begins to be rolled is small and/or the dough piece is tightly rolled, the angle (α) is adjusted by the adjusting means (18) so that the distance D becomes small. However, if the core portion of the dough roll is large and/or the dough piece is loosely rolled, the angle (α) is adjusted by the adjusting means (18) so that the distance D becomes larger. In this embodiment, the data for distance D is also stored in the memory (42). Therefore, when the operator presses down the button on the control panel in the control unit, which button corresponds to the diameter of the core portion of a finished dough roll, the signal generator (42) sends a signal to the reversible motors (26). Thus, the upstream end roller (20) is lifted or lowered so that the distance D is set to a predetermined length.

Since the lower endless belt device (16) is forwardly driven at a speed higher than that of the upper endless belt device (14), the dough portion that begins to be rolled and forms the core portion of the finished dough roll is readily fed into the narrow space between the belts of the upper and lower endless belt devices (14, 16). However, while the trailing end of the dough is held between the holding roller (10) and the belt of the endless belt supply device (8), the dough piece is stretched to have a predetermined length in the feeding direction. When the trailing end is released, the whole body of the dough piece is fed into the space between the belts of the upper and lower endless belt devices (14, 16). When the dough piece is transferred through the space, the dough is rolled up. When the rolled dough passes between the portions (16U) and (14L), all the loosened portions of the belt of belt device (14) gather at the portion (14L) to increase the distance between the belt portion (16U) and (14L), thereby allowing the passage of the rolled dough. Thus, the finished dough roll is discharged from the downstream ends of the upper and lower endless belt devices (14, 16).

In this embodiment the upper surface of the dough piece is wet and thus adhesive because water is sprinkled from the watering device (48). Therefore, when the dough begins to be rolled, the upper surface of the dough piece adheres to the lower surface, of the dough and thus in this embodiment the finished dough roll produced is not easily loosened. This means for sprinkling water to increase the adhesiveness of dough is disclosed in this applicant's earlier application, U.S. Ser. No. 064,070, filed June 18, 1987, and that application is hereby incorporated by reference.

The apparatus of this invention can be readily modified by those skilled in the art. A second embodiment of this invention, where the apparatus of this invention is used for producing croissants or butter rolls, will now be explained.

Except for minor changes, the construction shown in FIG. 1 can be used for producing croissants or butter rolls. This construction is explained below.

Figure 6:
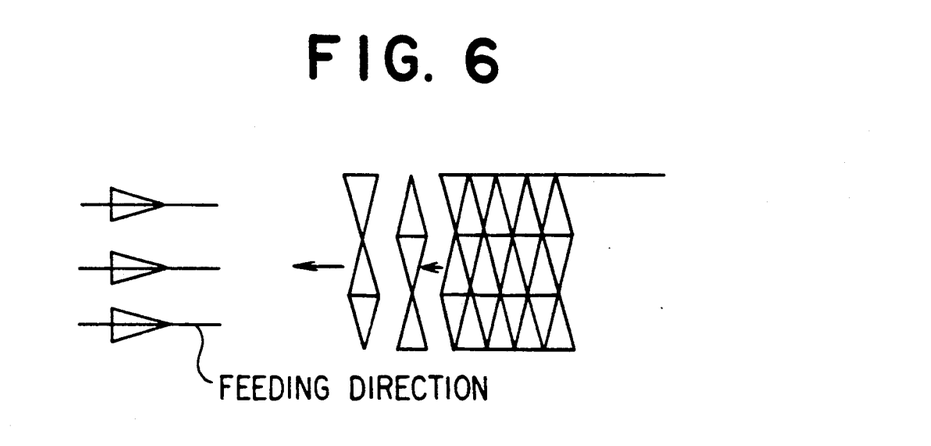
FIG. 6 shows schematically the steps for cutting triangular dough pieces for croissants or butter rolls from a web of a dough sheet and separating and reorienting them.

First, the cylindrical cutter device (62) should be replaced with a similar cutter device that has on its peripheral surface blades capable of forming triangular patterns in a dough web, as shown in FIG. 6. Further, an apparatus for producing the triangular dough pieces of the same orientation should be added between another type of spacing device and the pair of juxtaposed rollers (44, 46). The apparatus for producing the dough pieces of the same orientation may be an apparatus such as is disclosed in Austrian Patent No. 382,762, and this patent is hereby incorporated by reference. Further, the spacing device in this embodiment includes a pair of rollers extending transversely over the width of a dough web in place of the pair of rollers (66) and the roller (68) used in the first embodiment shown in FIG.

5. However, to simply show the spacing and orientating step, this spacing device and the belts of the endless belt devices (8, 16) are deleted from FIG. 6. Additionally, any conventional cutter device for forming triangular pattern dough pieces from a dough web, and an orientation device for orienting the dough pieces in the same direction, can be used for the same purpose.

As discussed above, the belt of the endless belt supply device (8) is driven at a speed higher than that of the peripheral speed of the lower roller (46) of the pair of juxtaposed rollers. This feature is provided for adjusting the orientation of a dough piece. When a triangular dough piece, fed with its base as a leading end as shown in FIG. 6, passes between the pair of juxtaposed rollers (44, 46) and is transferred to the endless belt supply device (8) via a small roller (50), the top of the triangular dough piece is held between the rollers (44, 46) while its base portion is located on the belt of the endless belt supply device (8). Since the belt of the endless belt supply device (8) moves faster than the peripheral speed of the pair of juxtaposed rollers, the dough is pulled by the belt of the endless belt supply device in the feeding direction. Therefore, the orientation of the triangular dough pieces is adjusted so that the base of each dough piece is arranged perpendicular to the feeding direction. This feature is disclosed in U.S. patent application, U.S. Ser. No. 064,070 filed June 18, 1987, now U.S. Pat. No. 4,905,583. Therefore, the dough pieces are rolled into a dough roll of a proper spindle form.

Figure 7:
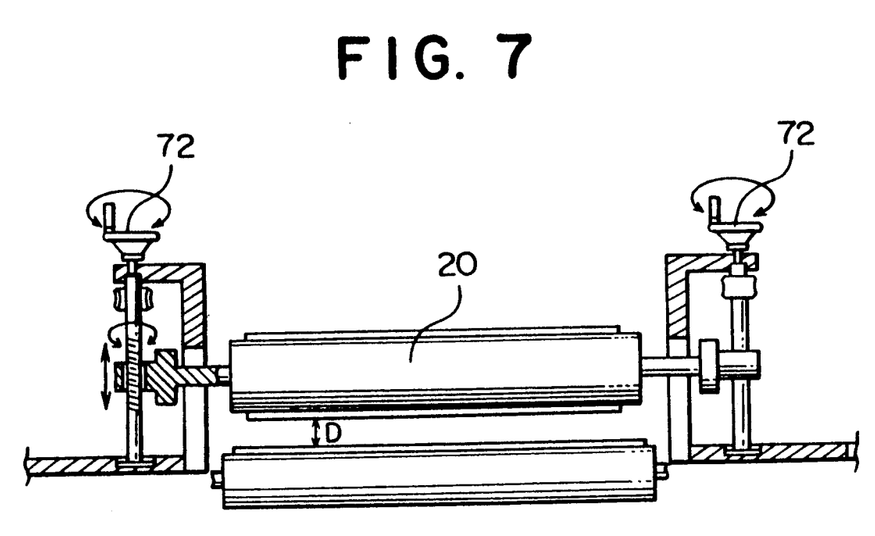
FIG. 7 shows an enlarged view of a device for manually adjusting the angle defined by the sloped portions of the upper and lower endless belt devices of another embodiment.

In FIG. 1, the motors to drive the endless belt devices and rollers are controlled by the control unit (32). However, if the control unit is not included, the speeds of the motors can be modified so that an operator can manually set the motors to drive these devices at predetermined speeds, based on the type of dough roll to be rolled. Further, in FIG. 1, the angle ($\alpha$) of the upper and lower endless belt devices is also controlled by the control unit (32). However, the adjusting means can be modified so that the angle ($\alpha$) can be manually adjusted. As shown in FIG. 7, if the reversible motors are replaced with the handles (79), the operator can adjust the angle ($\alpha$) by lifting and lowering the upstream end roller (20) via the handles (72).

Additionally, the endless belt supply device can be removed from the structure of the apparatus shown in FIG. 1. In this embodiment, the moving means (4) comprises the upper and lower rollers (44, 46). That is, the upper roller (44) acts as the holding roller (10) and the lower roller (46) acts as the endless belt supply device (8). Thus, based on the number of layers of a finished dough roll, the control unit (42) controls the second, third, and fourth motors (36, 38, 56), so that the belts of the upper and lower endless belt devices (14, 16) and the lower roller (56) move at predetermined speeds.

By changing the relation of the speeds of the belts of the upper and lower endless belt devices (14, 16), and the moving means (4), the dough pieces are stretched so as to have a desired length in the feeding direction. When the dough is rolled up, a dough piece having a desired number of layers can be produced. Therefore, the apparatus of this invention can produce dough rolls for various kinds of bread and confectionery.

TABLE

| Kind of Dough | Fr. Bread Dough | Croissant Dough | | Butter Roll Dough | |
| --- | --- | --- | --- | --- | --- |
| Number of | 5 | 5 | 7 | 5 | 7 |

TABLE-continued

| Kind of Dough | Fr. Bread Dough | Croissant Dough | | Butter Roll Dough | |
| --- | --- | --- | --- | --- | --- |
| Layers | | | | | |
| Speeds | | | | | |
| $V_1$ | 15 | 15 | 15 | 15 | 15 |
| $V_2$ | 56 | 56 | 70 | 70 | 70 |
| $V_3$ | 35 | 35 | 35 | 35 | 35 |
| (m/min) | | | | | |
| Angle ($\alpha$) in degrees | 35 | 35 | 35 | 35 | 35 |
| Thickness of Dough Piece (mm) | 7 | 3 | 3 | 3 | 3 |
| Diameter of Rolled Dough (mm) about | 62 | 29 | 31 | 28 | 32 |

We claim:
1. An apparatus for producing dough rolls having a predetermined number of layers, comprising:
   a moving means for moving a dough piece in a feeding direction;
   a rolling-up mechanism for rolling up each such dough piece while moving it in said feeding direction, said rolling-up mechanism having a lower endless belt device and an upper endless belt device arranged one above the other, wherein said lower endless belt device has an upper belt portion moving in the feeding direction, and said upper endless belt device has a lower belt portion moving in the opposite direction to that of the feeding direction at a speed lower than the speed of said lower endless belt device, said upper and lower belt portions facing each other with a spacing therebetween;
   control means for predetermining the number of layers in said dough roll by controlling the difference between (a) the amount by which the speed of said lower endless belt device exceeds the speed of said upper endless belt device, and (b) the speed of said moving means;
   a first driving means for driving each of said upper and lower endless belt devices; and
   a second driving means for driving said moving means at a speed lower than the lower endless belt device, which said first and second driving means are so formed that the speeds of said upper endless belt device and said lower endless belt device are changeable in relation to the speed of said moving means, based on the desired number of layers of said dough roll, said number being determined by the relationship between the respective speeds of said lower endless belt device, said upper endless belt device, and said moving means.

2. The apparatus of claim 1 further comprising a cutting means arranged upstream of said moving means.

3. The apparatus of claim 1, wherein said belt portions include respective sloped portions adjacent the upstream ends thereof and said sloped portions are positioned at an angle to define a tapered gap between said belt portions, said gap progressively decreasing from the upstream ends of said belt portions.

4. The apparatus of claim 3 further comprising adjusting means for adjusting said angle based on the diameter of the dough roll to be rolled, said adjusting means including reversible motors operatively connected to the control means.

5. The apparatus of claim 1 further comprising means for spacing dough pieces, said means for spacing being arranged upstream from said moving means.

6. The apparatus of claim 5 further comprising a cutting means arranged upstream of said spacing means.

7. The apparatus of claim 1, wherein said moving means comprises at its downstream end a first pair of vertically juxtaposed rollers spaced apart from each other by the thickness of a dough piece, the upper and lower rollers being driven at the same peripheral speed.

8. The apparatus of claim 7, wherein means is provided adjacent said upper roller of the pair of vertically juxtaposed rollers for providing water to the surface of said upper roller.

9. The apparatus of claim 8, further comprising a first roller of a small diameter positioned downstream of and adjacent the upper roller of said first pair of vertically juxtaposed rollers, the first roller being rotated in the direction of movement of the dough piece and faster in its peripheral speed than the peripheral speed of said upper roller, the diameter of the first roller being smaller than the diameter of the upper roller.

10. The apparatus of claim 1, wherein said moving means comprises an endless belt supply device arranged in series with said lower endless belt device and a holding roller provided above and adjacent the downstream end of said endless belt supply device, said roller being driven at a peripheral speed that is the same as the moving speed of the belt of said endless belt supply device.

11. The apparatus of claim 10, further comprising a second pair of vertically juxtaposed rollers spaced apart from each other by a given thickness of the dough piece, said second pair of rollers being positioned upstream of and adjacent the upstream end of said endless belt supply device, the upper roller of the second pair of rollers being driven at the same peripheral speed as that of the lower roller.

12. The apparatus of claim 11, wherein means is provided adjacent the upper roller of said second pair of vertically juxtaposed rollers for providing water to the surface of said upper roller.

13. The apparatus of claim 12 further comprising a first roller of a small diameter positioned downstream of and adjacent said holding roller of said endless belt supply device, the first roller being rotated in the direction of movement of the dough piece and faster in its peripheral speed than the peripheral speed of said holding roller, the diameter of the second roller being small than that of said holding roller.

14. The apparatus of claim 13 further comprising a second roller of a small diameter positioned downstream of and adjacent the peripheral surface of said upper roller of said second pair of vertically juxtaposed rollers, the second roller being rotated in the direction of movement of the dough piece and faster in its peripheral speed than the peripheral speed of said upper roller of said second pair of rollers, the diameter of the second roller being smaller than that of said holding roller.

* * * * *